July 21 1925.  
E. K. BAKER  
1,546,772  
METHOD OF AND MEANS FOR PRODUCING TIRE CARCASS MATERIAL  
Filed Nov. 5, 1919  
3 Sheets-Sheet 1
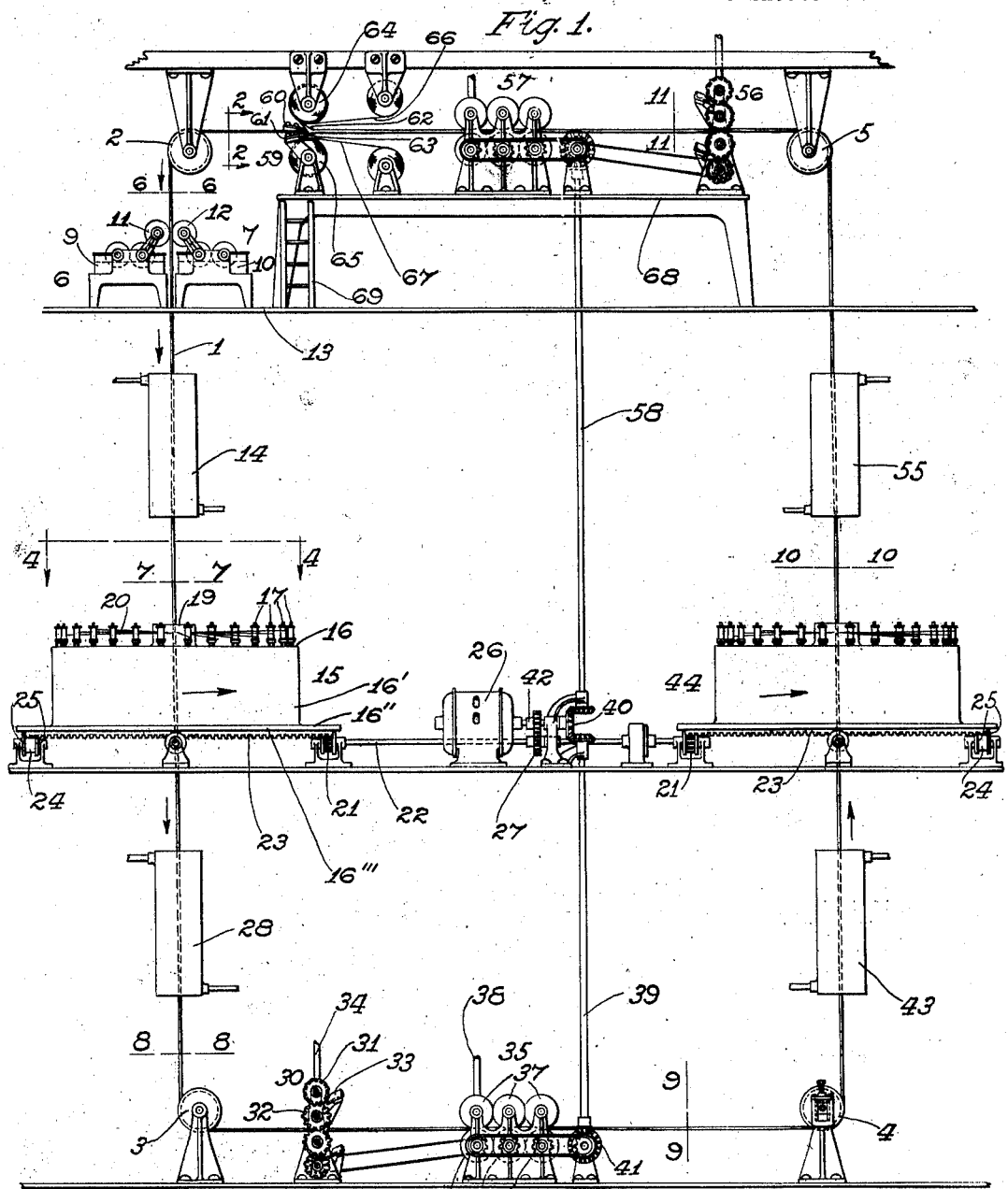
Fig. 1.
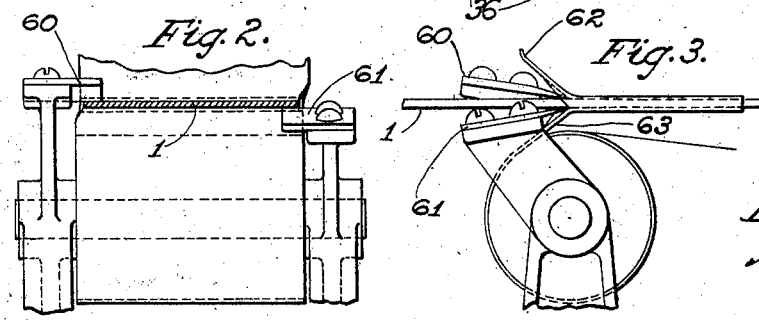
Fig. 2.   Fig. 3.
Inventor:
Erle K. Baker.

July 21. 1925.　　　　　　　　　　　　　　　1,546,772
E. K. BAKER
METHOD OF AND MEANS FOR PRODUCING TIRE CARCASS MATERIAL
Filed Nov. 5, 1919　　　3 Sheets-Sheet 2

July 21 1925. 1,546,772
E. K. BAKER
METHOD OF AND MEANS FOR PRODUCING TIRE CARCASS MATERIAL
Filed Nov. 5, 1919 3 Sheets-Sheet 3

Inventor
Erle K. Baker
By 
Atty

Patented July 21, 1925.

1,546,772

UNITED STATES PATENT OFFICE.

ERLE K. BAKER, OF CHICAGO, ILLINOIS.

METHOD OF AND MEANS FOR PRODUCING TIRE CARCASS MATERIAL.

Application filed November 5, 1919. Serial No. 335,832.

*To all whom it may concern:*

Be it known that I, ERLE K. BAKER, a citizen of the United States, and a resident of Chicago, Cook County, Illinois, have invented certain new and useful Improvements in Methods of and Means for Producing Tire Carcass Material, of which the following is a specification.

There are two general types of tires with respect to the carcass material which they employ, to-wit: the fabric type and the cord type. In the manufacture of the fabric tire it is customary to cut strips of the woven fabric into bias strips by clipping the corners from rectangular sheets and then to apply these bias strips to the tire mould. Because of the bias formation of the strips, it is necessary, in fabric tires, to use several lengths or pieces of fabric to complete one annulus, and this is done by making a lap joint which is objectionable, among other reasons, in that it produces a double thickness of fabric at that point.

The cord type of tire is considered far superior to the fabric type of tire both in durability and resiliency, but involves certain production disadvantages which have heretofore made this type quite expensive. The typical cord tire is produced by laying the cord directly upon the tire mould in superposed layers of diagonally disposed cords. This method of production is slow, laborious, and expensive, and in practice is limited to the use of relatively coarse cords which have proven to be less efficient than smaller cords.

The superiority of the cord type of tire over the fabric type, and the difficulties of production and defects just noted, have led to the practice of making so called cord tire which are, in reality, a fabric tire of a special kind. The fabric, in this instance, instead of being composed of interwoven warp and woof threads of the same size, is composed of warpthreads of a size considerably larger than the woof threads: the woof threads serving in this instance merely to hold the material together as a fabric to permit of its being clipped at the corners to provide bias material and to permit manipulation substantially with the same means and by the same methods employed in building the fabric tire. These woof, or cross threads, however, are a positive detriment when embodied in the tire, inasmuch as they, in a measure, serve to cut the warp threads with which they intertwine. This type of tire, however, approaches more nearly the advantages of a typical cord tire than it does the disadvantages of the fabric tire, and for this reason it is called a tire of the cord type.

It is an object of my invention to provide a method of and means for producing tire carcass material of the typical cord type, to-wit: crossed layers of unwoven cords, and to provide a material that can be utilized in the building of a tire under the general method employed in the manufacture of the fabric tire. One of the advantages of such material, over and above its inherent advantage as a typical cord carcass material, lies in the fact that the extensive and often elaborate machinery and equipment of the tire factories may be used with this material. So, also, workmen who have become skilled in the manufacture of tires under former tire-making methods may utilize that skill to a large degree when operating with my material.

A further object of my invention is to provide a method and means for manufacturing cord carcass material continuously; and other objects of my invention are to provide a method and means for manufacturing cord carcass material of improved character, rapidly, at less cost, in less space, in less time, and with less waste than has been possible under methods and means heretofore devised.

Again it is an object of my invention to provide a method and means whereby the cord carcass material can be better enveloped in rubber and the whole consolidated into an adhesive mass which shall be amply able to withstand all the pulling, stretching or other forces to which it is subjected both in the making of the tire and in use thereafter.

My invention consists generally in the steps, acts, and means whereby the above named objects, together with other which will appear hereinafter, are attainable, and my invention will be more readily understood by reference to the accompanying drawings which illustrate that form of my invention which I consider the best at the present time.

In said drawings:

Fig. 1 is a general elevation of mechanism embodying my invention, and of a character suitable for practicing my method for producing cord carcass material.

Fig. 2 is a detail view, upon an enlarged scale, taken substantially on the line 2—2 of Fig. 1.

Fig. 3 is a side elevation of the carcass severing mechanism shown in Fig. 2.

Figure 4:
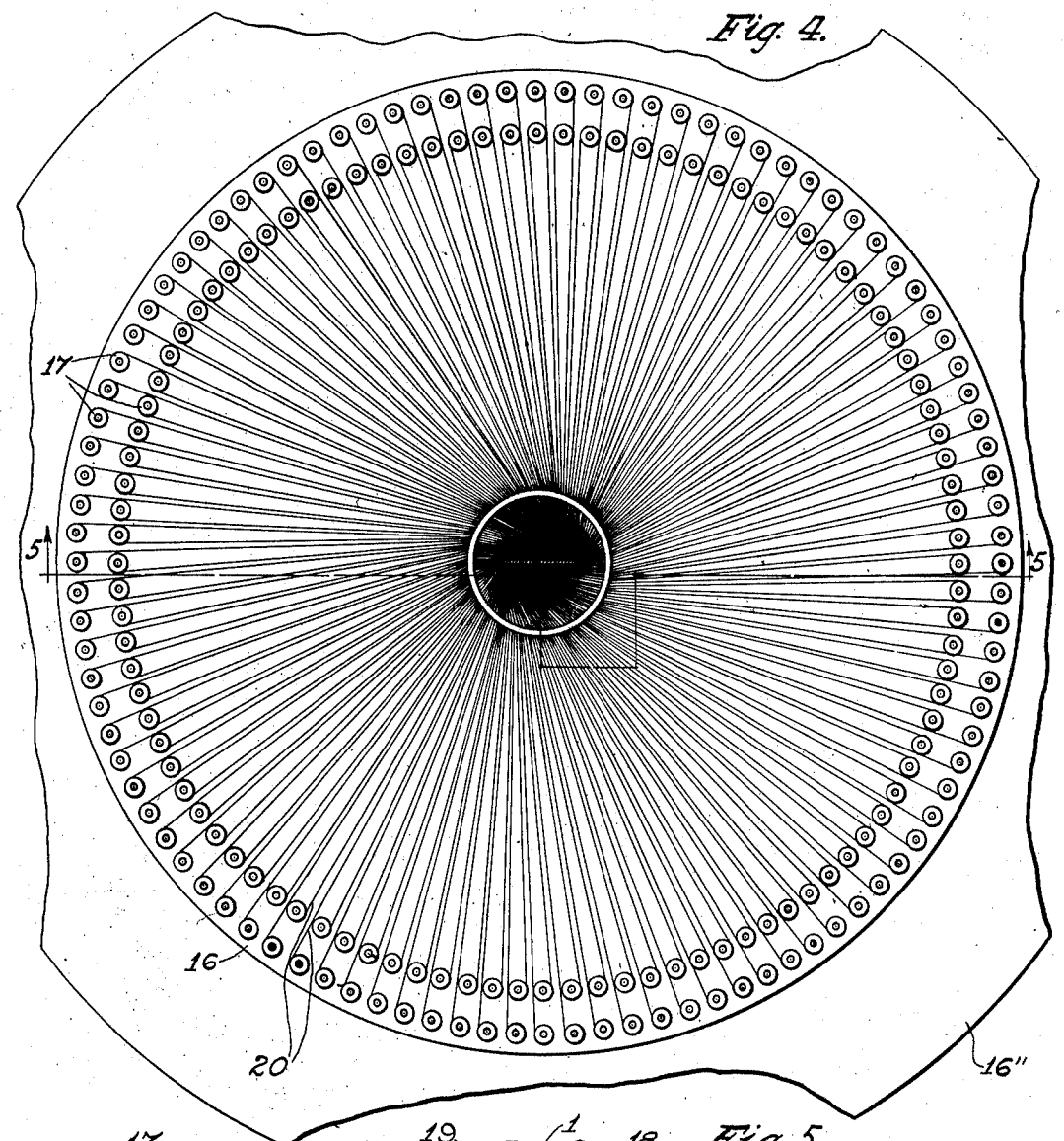
Fig. 4, is a view substantially on the line 4—4 of Fig. 1, but on an enlarged scale.

Figs. 6, 7, 8, 9, 10 and 11 are sectional views taken respectively on the lines 6—6; 7—7; 8—8; 9—9; 10—10; and 11—11 of Fig. 1, and being upon an enlarged scale.

Referring to said drawings 1 represents an endless metallic band which passes over spaced pulleys 2, 3, 4, and 5. The character of this band may vary to some extent but it is preferably a relatively thin band such as will enable it to pass over the pulleys 2 to 5 without buckling. It is also provided with highly polished surfaces to facilitate the removal of the tire carcass material therefrom.

The band 1, in this instance, is of such size, i. e. width, that when the carcass material is formed thereon it may be severed along the edges of the band thereby forming two strips, each strip being of a width such as will extend, when placed upon a tire mold, from one base to the other. Obviously by making the band wider a larger number of strips of desired size may be formed thereon.

The metal band 1 is caused to move at a predetermined speed, by means of mechanism to be described hereafter, in the direction of the arrows. Let us assume that the pulley 2, is the starting point or the commencement of one cycle of operation. From that point the band passes downwardly between two sets of mechanisms 6 and 7, respectively, which mechanisms operate to apply to the band 1 an enveloping coat of rubber 8 (see Fig. 7). As shown, in the present instance, the rubber in liquid form is contained in the receptacles 9 and 10 respectively, from which it is elevated by means of groups of rolls 11 and 12, respectively, two of which contact with and hence apply rubber to the band 1. The thickness of the layer of rubber applied to the band may be varied to suit the particular requirements and as a matter of fact the rubber, instead of being applied in a liquid or semi-liquid condition may be applied as a thin layer as in the frictioning of tire materials. After leaving the rubber applying mechanisms 6 and 7, the band passes downwardly through the floor 13 of the building and thence through a heating device 14 which serves to semi-cure the rubber on the band 1 and to condition it better to receive the cords or strands which are applied to the band by the cord winding mechanism 15.

The cord winding mechanism in this instance, is designed to lay on or apply simultaneously two hundred cords, but this it should be understood may be more or less, depending upon the size of the cord and the size of the carcass material being formed. The cord is carried upon a floating table 16, by means of a plurality of spindles 17 which are arranged, in the present instance, in two concentric rings adjacent the outer portion of the table. The cords from the various spools extend inwardly, each cord passing through one of the holes 18 in the central ring 19. There is a considerable amount of space between the spools and the ring 18 which space may accommodate any other mechanism desirable such for example, as mechanism for placing the respective cords under predetermined tension. In any event the respective cords are taut so that they may be conveniently handled and accurately placed. The cord winding mechanism 15 is rotated in the direction of the arrow, by mechanism to be described shortly. Thus as the band 1 passes downwardly, and as the cord winding mechanism rotates to the right, the cords are laid angularly across both faces of the band 1 in intimate side by side relation. Obviously the angle that the cord assumes on the face of the band 1 is determined by the relative speed of the cord winding mechanism and that of the band, but the angle is preferably a 45 degree angle since this, in practice, appears to give the best results. The various cords 20 are preferably primed with rubber before being wound upon the spool and when thus treated they more eagerly unite with and adhere to the band 1 and the rubber 8 thereon. The rubber 8, by the time it reaches the point for the application of the cord, is also in a very receptive condition. For some purposes, however, it may not be necessary or desirable to prime the cords before application to the band 1 and I, therefore, do not wish to be understood as limiting the invention to this particular type of cord.

Depending from the table is an annular wall 16' which terminates in an outwardly extending and horizontally disposed flange 16". This flange is of a width such that the operator can walk thereon around winding mechanism, and the wall 16' is of a height such that the spools contained on the table arranged at a distance above the flange 16 such as will enable the operator, conveniently, to attend to the replenishing of the spools as the materials thereon is from time to time exhausted. The machine is not essentially one of high speed operation so that the attendant, by riding on the flange 16″ can replenish the spools without stopping the operation of the machine.

The table is driven by means of a pinion 21 carried upon a line shaft 22 which pinion engages the annular gear rack 23 fixed upon the under face of the flange 16″. The table, in this instance, is held and guided for proper rotation by means of a plurality of rollers 24 which straddle the gear rack 23 and the flanges 25 of which engage the under face 16‴ of the flange 16″. The line shaft 22 is driven from the motor 26 through the medium of suitable gearing 27.

Figure 5:
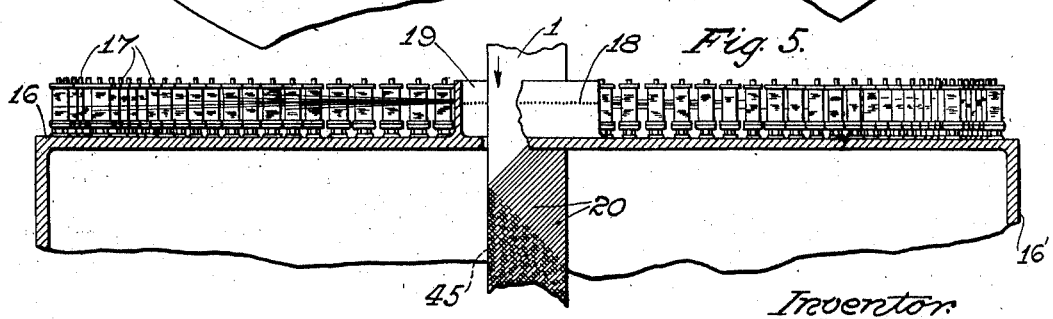
Fig. 5, is a view substantially on the line 5—5 of Fig. 4.
Figure 8:
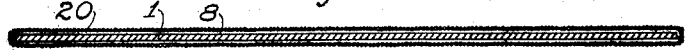
Figure 9:
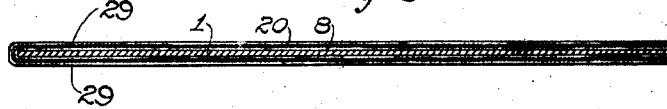
Figure 10:
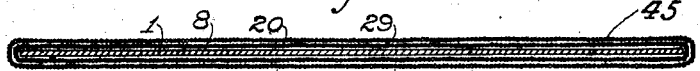
Figure 11:
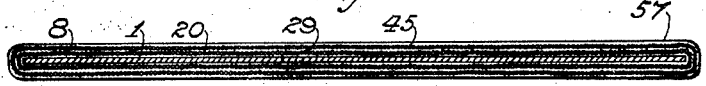
Figure 11:
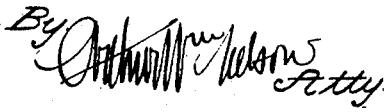

Thus as the band 1 leaves the cord winding mechanism 15, it lays the cords thereon in intimate side by side relation and angularly disposed on the face of the band as shown in Figures 5 and 8.

The band 1, as here shown, now passes through another heating or tempering device 28 which conditions the cord carcass material on the band 1 better to receive an adhering layer of rubber. The adhering layer of rubber 29, (see Fig. 9) is applied by means of frictioning mechanism 30 (see Fig. 1). This frictioning mechanism may be of usual construction and therefore, no detail description thereof need be given. Generally, however, it may be stated that it comprises two rolls 31 and 32 arranged above the band 1, which rolls are rotated by suitable means and thereby take the rubber from the shelf 33 and form it in a layer around the roll 32. The peripheral speed of the roll 32 is slightly greater than the speed of travel of the band 1 so that a layer of rubber 29 is spread upon the cord carcass material previously placed upon the band by the winding mechanism 15. The rolls 31 and 32 are kept at proper temperature by means of the steam pipe 34 and the rubber that is applied to the shelf 33 is previously properly conditioned in well known manner. On the under side of the band will be found similar rubber applying rolls to spread rubber on the other side of the band, but since their construction and operation has already been described, no further mention will be made thereof.

As the band 1 leaves the rubber applying or frictioning mechanism 30 it will be found to contain the cords and enveloping layers of rubber but it is quite desirable that these materials shall be compacted into a mutually adhering tenacious mass. It is also essential that the rubber shall be forced into place so as to rubber insulate the respective cords one from the other. As a matter of fact the proper application of rubber to the cord carcass material and the consolidation thereof with the cords has been one of the most baffling problems met with in the production of cord tires and is a potent factor in the present excessive cost of cord tires. Heretofore it has been attempted to apply the frictioning or insulating rubber to a sheet of the cord material but since such cord material, as heretofore explained, is held together only by relatively few and extremely small and delicate cross threads, this operation has been and is one difficult of accomplishment. In my method, however, the cords are very tightly wrapped around the thin band of metal which forms an ideal element for passage not only through the frictioning rolls, but also through the rolls which I provide for subjecting the material to pressure and heat such as will consolidate the component parts into the mutually adhering tenacious, yet resilient material desired. The consolidating mechanism is shown at 35 and as shown is composed of a plurality of lower drums 36 and a plurality of upper drums 37, which are spaced apart a distance such as will permit the band 1 and the cord material carried thereon to pass between the rolls 36 and 37 being, however, subjected to any desired predetermined pressure, depending upon the spaced relation of the drums 36 and 37. The drums 36 and 37 are maintained at desired temperature by steam supplied through a steam pipe 38. The drums 36 and 37 are utilized for an additional purpose and that is to impart the desired movement to the band 1. This is an ideal drive for slippage is impossible because of the character of the material on the band 1 and the pressure rolling of the drums 36 and 37 thereon. It becomes possible by this method to subject the cord material and enveloping layers of rubber to any desired practical pressure and to thereby consolidate the cords and rubber into a homogeneous mutually adhering tenacious, yet resilient, mass.

Motion is imparted to the drums 36 and 37 through the medium of the line shaft 39, gearing 40 and 41. The shaft 39 is driven from the motor 26 by means of the shaft 42.

After leaving the mechanism 35 the band passes over the pulley 4 through the heat tempering device 43 on to the cord winding mechanism 44. The construction and operation of the cord winding mechanism 44 is similar to that of the cord winding mechanism 15 and no further description thereof will be given. The driving mechanism is such as to rotate the table in the direction of the arrow thereon but since the band 1 passes upwardly through the cord winding mechanism 44 instead of downwardly therethrough, as in the cord winding mechanism 15, the cords will be laid cross wise with respect to those already on the band. This is indicated by means of the dotted line 45 in Fig. 5. The cords supplied by the mechanism 44 are also given the number 45 in Fig. 10. The band 1 with the two layers of cord material thereon now passes upwardly through the heat tempering device 55 thence over the pulley 5 and on to the rubber applying or frictioning device 56. The mechanism 56 is or may be similar to the mechanism 30 heretofore described and no further description thereof will be given. It serves to apply a layer of rubber 57ª to the second layer of cords (see Fig. 11) and thereafter the band with its layers of rubber and cords passes on to the mechanism 57 which mechanism is like unto the mechanism 35 and serves to pressure roll, heat and consolidate the rubber and cords. The mechanism 58 likewise is a driving mechanism the shaft 57 transmitting power therethrough through suitable gearing. Thereafter the band passes onwardly to the severing mechanism 59 which, in the present instance, is composed of two knives 60 and 61, respectively, (best shown in Figs. 2 and 3,) which sever the cord carcass material along the opposite edges of the band 1 and thus form it into two strips 62 and 63, respectively which strips are wound upon the spindles 64 and 65 respectively.

Inasmuch as the strip material is in semicured or sticky condition canvas strips 66 and 67 are wound simultaneously onto the spindles 64 and 65 with the strips 62 and 63 thus preventing adhesion of the adjacent convolutions of cord carcass material.

The mechanisms 56, 57 and 59 are all mounted in the present instance upon a platform 68 which may be conveniently reached by means of steps 69.

Figure 6:
Figure 7:
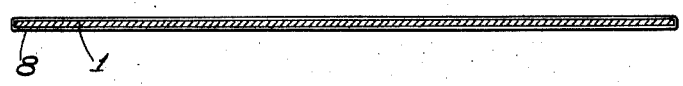

As the band 1 leaves the mechanism 59 it is again in the form shown in Fig. 6, i. e. a band of metal having highly polished surfaces, for the cord carcass material because of its semicured condition leaves the band free and clean. It will be seen therefore that the operation is or may be a continuous one and that strips of cord carcass material of any desired length may be provided. These strips of cord carcass material may be manipulated in the manner heretofore customary in the manipulation of fabric material or material of the so-called cord type, except that it is not necessary to cut away the corners of the material to form bias strips because the cord is laid on the bias when applied to the band 1.

I have described the operation as comprising and including two layers of cross unwoven cords, but I wish it to be understood that this is by way of illustration and not by way of limitation for the number of layers may be more or less. For example, the cord carcass material may be severed or removed from the band 1 after it leaves the mechanism 35 at which time it contains thereon only one layer of cord carcass material (see Fig. 9), but as already explained the operations are such that the rubber and cord are consolidated into a mutually adhering mass and the strip is in effect a rubber band which can be freely pulled and shaped, as may be necessary in the operations in forming the material to and shaping it upon the tire mold, all without danger of separating the cords. Of course, if only one layer of cords is to be formed the second winding and other mechanism will be eliminated.

I have described the various parts as occupying certain positions relative to the vertical and horizontal planes, but this I wish to be considered as by way of illustration and not by way of limitation. For example, the mechanism 36 is shown as being in a horizontal plane as likewise is the frictioning mechanism 35. These, obviously, may be placed to operate upon the band while the same is moving through a vertical or other plane.

The great simplicity and obvious advantages of the method and mechanism herein disclosed will be apparent to those skilled in this art without further comment.

I claim:

1. The method of making cord carcass material which consists in enveloping a flat band with a plurality of cords, consilidating the cords into an adhering mass while on the band, and in removing the consolidated material from the band by slitting it at the edges of said band to provide a plurality of flat carcass strips.

2. The method of making cord carcass material which consists in enveloping a flat, polished, metallic band with a plurality of cords, consolidating the cords into an adhering mass while on the band and in removing the colsolidated material from the band by slitting it at the edges of said band to provide a plurality of flat carcass strips.

3. The method of making cord carcass material which consists in winding a plurality of cords upon and thereby enveloping a flat moving band, consolidating the cords into an adhering mass while on the band, and in removing the consolidated material from the band by slitting it at the edges of said band to provide a plurality of flat carcass strips.

4. The method of making cord carcass material of strip form, which consists in enveloping a flat band with a plurality of cords, consolidating the cords into an adhering mass while on the adhering mass, and in severing the band longitudinally at the edges of the band to convert it into duplex flat strip form.

5. The method of making cord carcass material of substantially endless strip form which consists in enveloping a flat, endless moving band with a plurality of cords, consolidating the cords into an adhering mass, and in longitudinally severing the consolidated material at the edges of the band to convert it into duplex flat strip form.

6. The method of making cord carcass material which consists in applying rubber to a flat band, enveloping the rubberized band with a plurality of cords, consolidating the cords and rubber into an adhering mass, and in removing the consolidated material from the band.

7. The method of making cord carcass material which consists in enveloping a flat band with a plurality of cords, applying rubber to the cord material, consolidating the cords and rubber into an adhering mass while on the band, and in removing the consolidated material from the band by slitting it at the edges of the band to provide a plurality of flat carcass strips.

8. The method of making cord carcass material which consists in applying rubber to a flat band, in enveloping the band with a plurality of cords, applying rubber to the cord material, consolidating the cords and rubber into an adhering mass while on the band, and in removing the consolidated material from the band.

9. The method of making cord carcass material which consists in enveloping a flat band with a plurality of cords so disposed thereon as to extend diagonally across the face of the band, consolidating the cords into an adhering mass while on the band, and in removing the consolidated material from the band by slitting it at the edges of the band to provide a plurality of flat carcass strips.

10. The method of making cord carcass material which consists in enveloping a flat band with a plurality of cords, consolidating the same into an adhering mass by passing the band, with its envelope of cord material, through pressure rolls, and in removing the consolidated material from the band by slitting it at the edges of the band to provide a plurality of flat carcass strips.

11. The method of making cord carcass material which consists in enveloping a flat band with a plurality of cords, in enveloping the cords carried by the band with other cords, in consolidating all of the cords into an adhering mass while on the band, and in removing the consolidated material from the band by slitting it at the edges of the band to provide a plurality of flat carcass strips.

12. The method of making cord carcass material which consists in applying rubber to a flat band, in enveloping the rubberized band with a plurality of cords, in applying rubber to the cords placed upon the band, in enveloping the rubberized cord with a plurality of cords, consolidating all of the cords and rubber into an adhering mass while on the band, and in removing the consolidated material from the band.

13. The method of making cord carcass material which consists in applying rubber to a flat band, enveloping the rubberized band with a plurality of cords, consolidating the cords and rubber into an adhering mass, in semicuring the material while on the band, and in removing consolidated material from the band.

14. The method of making cord carcass material which consists in enveloping a flat band with a plurality of cords, applying rubber to the cord material, consolidating the cords and rubber into an adhering mass while on the band, semi-curing the material while on the band, and in removing the consolidated semicured material from the band.

15. The method of making cord carcass material which consists in applying rubber to a flat band, enveloping the band with a plurality of cords, applying rubber to the cord material, consolidating the cords and rubber into an adhering mass while on the band, in semi curing the material while on the band, and in removing the consolidated semi-cured, material from the band.

16. The method of making cord carcass material which consists in applying rubber to a flat band, enveloping the rubberized band with a plurality of cords, consolidating the cords into an adhering mass while on the band, in semi-curing the material while on the band, and in removing the consolidated semi-cured material from the band.

17. The method of making cord carcass material which consists in applying rubber to a flat band, in enveloping the rubberized band with a plurality of cords, in applying rubber to the cords placed upon the band, in enveloping the rubberized cord with a plurality of cords, consolidating the cords and rubber into an adhering mass while on the band, in semi-curing the material while on the band, and in removing the consolidated semi-cured material from the band.

18. A continuous cord carcass mill, comprising a flat band, means for forwarding said band, means for winding a plurality of cords about the band to form an envelope in which the cords extend diagonally of the face of the band, means for consolidating the cords into an adhering mass, and means for severing the material longitudinally at the edges of the band to convert it to duplex strip form.

19. A continuous cord carcass mill, comprising a flat band, means for applying rubber to said band, means for forwarding said band, means for winding a plurality of cords about the band to form an envelope in which the cords extend diagonally of the face of the band, means for consolidating the cords into an adhering mass, and means for severing the material longitudinally to convert it to strip form.

20. A continuous cord carcass mill, comprising a flat band, means for applying rubber to the band, means for forwarding the band, means for winding a plurality of cords about the band to form an envelope in which the cords extend diagonally of the face of the band, means for consolidating the cords into an adhering mass, means for semi-curing the material, and means for severing the material longitudinally to convert it to strip form.

21. A continuous cord carcass mill, comprising a flat band, means for applying rubber to the band, means for forwarding said band, means for winding a plurality of cords about the band to form an envelope in which the cords extend diagonally of the face of the band, means for consolidating the cords into an adhering mass, and means for semi-curing the material.

In testimony whereof, I have hereunto set my hand, this 22nd day of October, 1919.

ERLE K. BAKER.